Sept. 2, 1941.                G. TOMSIC                2,254,634
                              CARBURETOR
                           Filed May 4, 1938
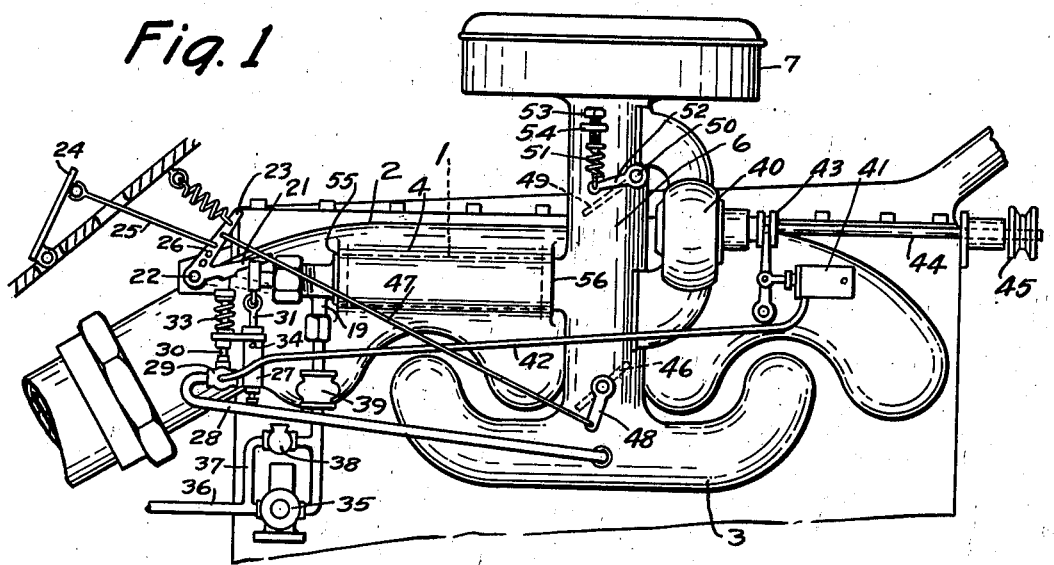
Fig. 1
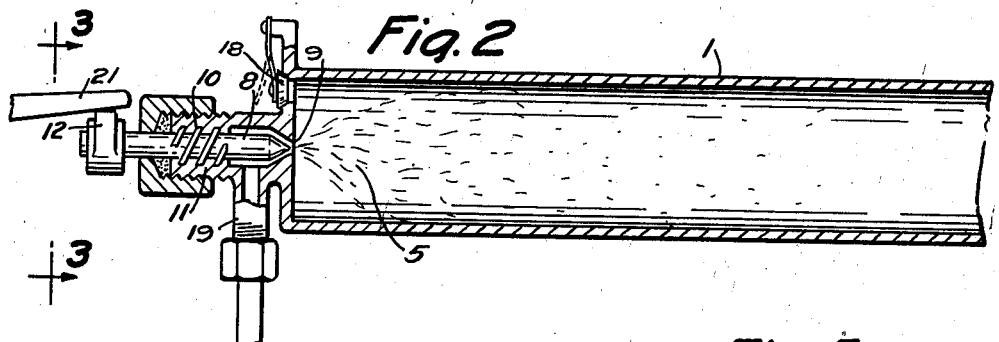
Fig. 2
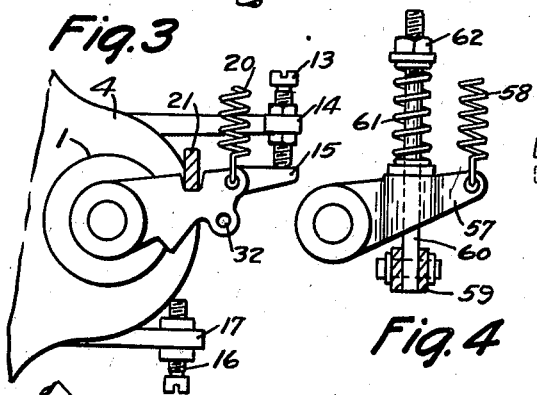
Fig. 3                    Fig. 5
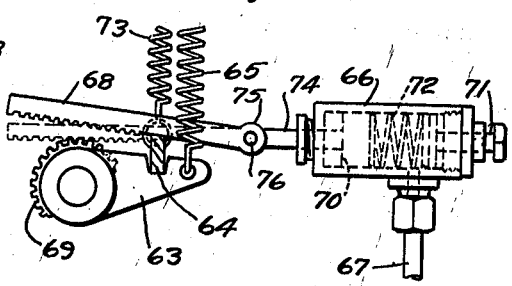
Fig. 4
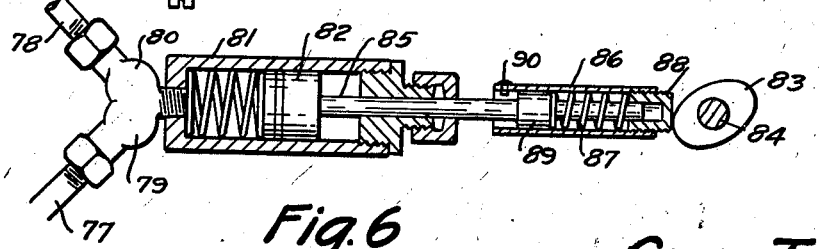
Fig. 6
INVENTOR.
Guy Tomsic
BY James Harrison Bowen
ATTORNEY.

Patented Sept. 2, 1941

2,254,634

UNITED STATES PATENT OFFICE 2,254,634

CARBURETOR

Guy Tomsic, New York, N. Y.

Application May 4, 1938, Serial No. 205,925

11 Claims. (Cl. 123—133)

The purpose of this invention is to improve atomization of fuels for internal combustion or other engines by injecting the fuel under pressure into a substantial vacuum in a relatively hot chamber, preferably in the exhaust manifold, and then injecting the fuel in combination with air into the cylinders through the intake manifold.

The invention is in the means for accomplishing the above in combination with automatic regulating means which embodies controlling the fuel, and, therefore, the engine, through a needle valve operated by a foot throttle, and with the needle valve and also the super-charger adapted to be automatically controlled by the vacuum of the engine.

Other devices have been used for heating fuel and air from and in the exhaust manifold of internal combustion engines, but these heat the fuel in combination with air, and most all others heat the air; whereas, in this device, the fuel is atomized by pressure, and preheated in a tube in the exhaust manifold, and then mixed with cool air before it is exhausted into the cylinders of the engine.

The object of this invention is, therefore, to provide a preheating chamber positioned directly in the path of the exhaust gases, and means for atomizing liquid fuel by injecting it under pressure into said preheating chamber.

Another object is to provide an improved method of controlling the speed of a motor vehicle by controlling the amount of fuel passing into the engine, with a needle valve positioned in the path of the fuel and controlled by the foot throttle.

Another object is to provide means for using relatively cool air in an internal combustion engine in combination with atomized preheated fuel.

Another object is to provide a pump for supplying fuel to internal combustion engines under pressure, in which the pump is provided with a yielding movement preventing raising the pressure beyond a predetermined amount.

A further object is to provide an improved control for motor vehicles, in which auxiliary means, in combination with a super-charger, is provided for controlling the air before and after it is combined with the fuel.

And a still further object is to provide an improved method of controlling and atomizing the fuel of internal combustion engines which provides relatively simple and economical construction.

With these ends in view the invention embodies a fuel heating tube positioned in the exhaust manifold, a fuel supply communicating with said tube, a needle valve through which the fuel from the supply passes into the tube, means controlling the needle valve by a foot throttle, additional means controlling the needle valve by the vacuum of the engine, a pump for supplying fuel under pressure, and means controlling the air.

Other features and advantages of the invention will appear from the following description, taken in connection with the drawing, wherein:

Figure 1 is a view showing a typical general arrangement of the device with parts broken away and parts omitted.

Figure 2 is a detail showing a typical design of the heating chamber, atomizer, and needle valve.

Figure 3 is a detail showing an end view of the valve operated lever on section 3—3 of Figure 2.

Figure 4 is a similar view showing an alternate design, in which the lever is operated with a resilient movement.

Figure 5 is also a similar view showing another alternate design, in which the valve is also operated by the vacuum of the engine.

Figure 6 is a detail showing a typical design of a pump for supplying fuel under pressure, in which means is provided for preventing the pressure exceeding a predetermined amount.

In the drawing the device is shown as it may be made, wherein numeral 1 indicates the fuel heating chamber, numeral 2, an exhaust manifold, and numeral 3, an intake manifold.

The chamber 1 is in the form of a tube, and this is preferably mounted in the exhaust manifold 2, and, in order to facilitate construction, the manifold is provided with an extended portion 4, as shown in Figure 3, so that the tube 1 may extend therethrough with the ends of the tube projecting through the ends of the part 4 of the manifold. The manifold may otherwise be constructed in any suitable manner. Fuel is supplied to one end of the tube 1 through an atomizer, preferably as illustrated in Figure 2, and, as it is injected into the tube under pressure, it is thoroughly atomized, as indicated at the point 5, and the tube, being located in the exhaust manifold and, therefore, relatively hot, volatilizes the atomized fuel, and the fuel, in this form, passes into the vertical section 6 of the intake manifold, and then downward into the manifold 3 and directly into the cylinders. Relatively cool air is mixed with the fuel as it passes downward in the section 6 of the manifold, the air being admitted through a filter 7 which may be of any type or design.

It is also understood that any suitable type of atomizer may be used, any means may be provided for supplying fuel under pressure, and the needle valve in the atomizer may be connected to the foot throttle, vacuum, or any other means in any manner.

A typical arrangement is illustrated in the drawing, in which the atomizer is formed with a needle valve 8, with the point extending into a relatively small opening 9, and the valve 8 is provided with an external screw thread 10 threaded in a nipple 11 at the end of the cylinder 1, and the outer end of the valve is provided with a lever 12 by which it may be operated or turned to adjust the position of the needle valve. It will be noted that, as this valve is turned backward, it will open the orifice and permit more fuel to pass through the atomizer, and, as it is turned in the opposite direction, it will close and restrict the amount of fuel passing to the atomizer. An adjustable stop, formed by a screw 13 in a lug 14, is provided to engage a projection 15 of the lever 12 to limit the closing movement of the valve to prevent its being completely closed, permitting the engine to idle and preventing its stopping when the foot throttle is released. A similar stop is provided below the lever 12 to limit the opening movement of the valve, and this is formed by a screw 16 in a lug 17, and it will be noted that this may be adjusted to obtain as large an opening as may be desired with the valve in the full open position. It will be appreciated, however, that these stops may be provided at any other points, and any means may be used for limiting the opening or closing movement of the valve. This end of the cylinder 1 may also be provided with a thermostatically controlled valve 18 which is open when the engine is cold, and admits air for starting with a cold engine, but this is closed by the thermostat as soon as the engine is hot. The nipple 11 is provided with a side nipple 19 which is connected by a tube to a fuel pump or any means for supplying fuel under pressure.

In the most simple form the lever 12 is held upward by a spring 20 which may be attached to any suitable part of the vehicle, and the lever is moved downward by a lever 21 pivotally mounted at the point 22 as shown in Figure 1, and this is connected through an arm 23 to a foot throttle 24 through a rod 25. The arm 23 is provided with a plurality of holes 26 in which the end of the rod 25 may be connected to regulate the movement of the lever 21 in relation to the movement of the foot throttle 24. As the foot throttle is moved downward, the lever 21 will move the lever 12 downward, and this will open the needle valve and permit more fuel to pass to the engine, and, as soon as the foot throttle is released, the spring 20 will return the needle valve to the closed position.

The lever 12 may also be provided with a connection to a vacuum cylinder 27, similar to the cylinder shown in Figure 5, and this is connected by a tube 28 with a valve 29 therein to the intake manifold 3, and the valve 29 is positioned below the lever 21 so that it is only opened when the lever 21 is in the extreme lower position. When the valve has been opened by the foot throttle, so that the lever 21 moves the lever 12 downward to the extreme position, the lever 21 then engages the stem 30 of the valve 29, opening the valve, and thereby connecting the cylinder 27 to the vacuum, and the vacuum cylinder through a connection 31 in an eye 32 of the lever 12 draws the lever downward, opening the needle valve further and admitting more fuel to the engine which is necessary for high speeds. It will be noted that, as soon as the foot throttle is released, the lever 21 will be raised by a spring 32, and the valve 30 will instantly be closed by a spring 33 so that the vacuum will be cut off, thereby permitting the needle valve to be substantially closed by the spring 20. The lever 12 will instantly raise the piston in the vacuum cylinder 27 as soon as the valve 30 is closed, as the upper part of the cylinder is provided with a vent 34 permitting the escape of air above the piston and providing freedom of movement which will enable the needle valve to close instantly to the idling position. These parts may be considered as being only diagrammatically shown in Figure 1, and it will be understood that they may be arranged in any other manner, and mounted by any means.

Any suitable means may be provided for supplying gasoline or other fuel under pressure, although it is desired to provide a fuel pump having a little more pressure than pumps ordinarily used, and, at the same time, these pumps must be provided with means whereby the pressure will not exceed a predetermined amount. In the design shown in Figure 1, the fuel supply tube 18 is connected to a pump 35 to which fuel may be supplied by a tube or pipe 36 to the gasoline or fuel supply tank, and the pump may be provided with a by-pass 37 having a relief valve 38 therein so that, as the pressure beyond the pump exceeds a predetermined amount, the relief valve will permit the fluid to pass backward to the pump inlet to be recirculated. The tube 18 may also be provided with a relatively small reservoir 39 which will hold a small quantity of fuel under pressure to offset the pulsating action of the pump. This reservoir, however, is positioned to drain backward through the pump when the pump is stopped. It will be understood that the pump may be operated by the cam shaft or any suitable means. A typical pump is shown in detail in Figure 6, although, as hereinbefore stated, any suitable pump may be used.

The device may also be provided with a super-charger fan or blower 40 positioned in a passage communiuating with the upper part of the section 6 of the intake manifold, and also with the lower part to which air is discharged. This super-charger is automatically started when the foot throttle has substantially reached its extreme position, as, when the foot throttle opens the valve 29, it also opens the vacuum to another vacuum cylinder 41 through a tube 42, and this operates a clutch 43 on the shaft 44 which operates the super-charger, the shaft having a pulley 45 at the outer end engaging the fan belt of the engine. It will be understood that the shaft and super-charger may be rotated by any other means.

The lower part of the section 6 may also be provided with a baffle or valve 46, which may be connected by a rod 47 through an arm 48 to the lever 23, so that, as the foot throttle is moved downward, the valve 46 will turn to the full open position. It will also be understood that this valve may be operated by hand or by any means.

Another valve 49 may be positioned in the upper part of the section 6, and this may be hinged on a shaft 50 and resiliently held upward by a spring 51 through an arm 52, the tension on the spring being adjusted by a screw 53 in a lug 54. It will be noted that, as the suction increases, the valve or gate 49 will move downward to the full open position. It will also be understood that this valve may be mounted in any manner, or operated manually, or automatically, or by any means.

It will also be understood that any means may be provided for connecting the ends of the chamber 1 in the part 4 of the exhaust manifold at the points 55 and 56, or this section may be mounted in combination with the exhaust manifold so that it will be directly in the path of the exhaust gases, or by any means.

In the design shown in Figure 4, the lever 57, similar to the lever 12, is resiliently held upward by a spring 58 similar to the spring 20, however, the lever 21 is replaced by a yoke 59 positioned below the lever 57 and connected to a rod 60 extending upward through the lever 57, with a spring 61 on the upper part thereof, and with the tension of the spring adjustable through a nut 62 on the upper end of the rod 60. As the foot throttle is pressed downward, the part 59 will draw the rod 60 downward, and this acting through the spring 61, will draw the lever 57 downward, and the movement thereof may be adjusted by adjusting the tension on the spring.

In the design shown in Figure 5, the device is provided with a lever 63 similar to the lever 12, and this may be moved downward by a lever 64 similar to the lever 21 and held upward by a spring 65 similar to the spring 20, with this part of the operating means corresponding to that shown in Figure 3, however, in addition to this lever, the needle valve is controlled by the vacuum through a cylinder 66 connected to the vacuum of the engine through a tube 67, and the cylinder is connected to the needle valve through a rack 68 which is normally held upward in the position shown in Figure 5 by the lever 64, however, when the foot throttle is pressed downward until the lever 64 and also the lever 63 reach their downward movement, the rack 68 drops upon a gear segment 69, and then, as the vacuum increases, the rack will be drawn toward the cylinder 66 by a piston 70, so that the opening movement of the needle valve will be continued, the lever 63 leaving the lever 64. This movement may be adjusted by a screw 71 in the end of the cylinder 66 which adjusts the tension on a spring 72, acting against the piston 70 in the vacuum cylinder. However, as soon as the foot throttle is released, the lever 64 will be moved upward by an auxiliary spring 73, similar to the spring 65, and connected to the end of the lever 64, and, as soon as this lever reaches the upper end of its upward movement, it will disengage the rack 68 from the gear segment 69, permitting the spring 65 to raise the lever 63 and close the needle valve even though the vacuum may remain the same. The rack 68 is shown pivotally attached to the end of the piston rod 74 at the point 75, and through a pin 76, and it will be understood that this is only typical as the rack and pin may be mounted and held by any means.

It will be understood, however, that any other means may be provided for connecting the needle valve to the vacuum of the engine, and also for disengaging the valve from the vacuum as may be desired.

In the design shown in Figure 6, an automatic release pump is provided with an inlet pipe 77 and a discharge pipe 78 similar to the pipe 18, and these are provided with check valves 79 and 80 in a fitting at the end of a cylinder 81 having a piston 82 therein which is operated by a cam 83, preferably on the cam shaft 84 of the engine, and the piston rod 85 is mounted in an auxiliary cylinder 86 having a spring 87 therein, and it will be noted that the cam drives the piston through the spring 87, and the tension of the spring, which may be adjusted by a nut 88 in the end of the cylinder 86, corresponds with a predetermined pressure, so that, as soon as this pressure is obtained by the pump, the spring 87 will permit the cam to rotate without operating the piston 82. The cylinder 86 is slidable over a bushing 89 on the end of the connecting rod 85, and its outward movement is limited by a lug 90 in the end of the cylinder. It will also be understood that these parts are only typical, and may be arranged in any manner.

It will be understood that other changes may be made in the construction without departing from the spirit of the invention. One of which changes may be in the use of other means for supplying the atomized fuel to the end of the cylinder 1, another may be in the use of other means of connecting the tube or chamber 1 in the exhaust manifold, another may be in the use of other means for supplying fuel under pressure, and still another may be in the use of other automatic devices for regulating the pressure, fuel and air passing through the device.

The construction will be readily understood from the foregoing description. In use this device may be mounted directly upon an internal combustion or other engine, with the heating chamber positioned at any point and mounted in any manner in the exhaust manifold. Any means may be used for supplying fuel under pressure through an atomizer by which the fuel is sprayed into the chamber 1, and the fuel, the temperature of which is raised to a relatively high degree, is passed through the intake manifold and to the engine cylinders. The fuel is mixed with relatively cool air in the manifold, so that, as the air is heated and compressed, the maximum expansion will be obtained, and the maximum amount of pressure will be obtained in the cylinders. This device is a carburetor, and the atomizing action is accentuated by the fact that a partial vacuum exists in the tube 1, as the fuel and air are drawn therethrough by the vacuum of the intake manifold and cylinders, and, by this arrangement, it is possible to control the speed of the engine by the needle valve of the atomizer, providing a very delicate and accurate control, and, at the same time, by controlling the fuel, it is believed that the minimum amount of fuel will be used, and the maximum amount of efficiency obtained therefrom.

In starting the engine, while cold, it may be found desirable to provide a vent in the end of the fuel heating chamber to permit the atomized fuel to be drawn through the chamber, and, therefore, the valve 18 is provided. This valve, however, will close as soon as the manifold becomes hot.

Having thus fully described the invention, what I claim as new, and desire to secure by Letters Patent, is:

1. In a charge forming device having an air inlet passage and a vaporizer, said vaporizer comprising a confined open unobstructed relatively large heated chamber with a surrounding jacket, characterized by means spraying fuel in liquid form and substantially at atmospheric temperature into the chamber at one end, and with an unrestricted opening of substantially the same diameter as the chamber providing a fuel outlet at one end, said outlet communicating with said air passage substantially at a right angle.

2. A device as described in claim 1, in which the fuel is sprayed through a nozzle, and means adjusting the nozzle, in combination therewith, from the exterior of the device to regulate the amount of fuel sprayed.

3. In combination with the device as described in claim 1, a mixing chamber communicating with the open end of the said former chamber.

4. In combination with a device as described in claim 1, a mixing chamber, the central part of which communicates with the unrestricted fuel outlet opening of said device, and flow control valves at each side of the said communicating point.

5. In combination with a device as described in claim 1, a mixing chamber, the central part of which communicates with the unrestricted fuel outlet opening of said device, and flow control valves on each side of the said communicating point, one end of said mixing chamber opening to the atmosphere, and the other opening into an air passage.

6. In combination with a device as described in claim 1, a mixing chamber, the central part of which communicates with the unrestricted fuel outlet opening of said device, flow control valves on each side of said communicating point, one end of said mixing chamber opening to the atmosphere and the other opening into an air passage, and a by-pass connection with air inducing means therein by-passing the flow control valve in the inlet end of the mixing chamber, and means controlling the air inducing means by vacuum in the air passage.

7. In combination with a fuel atomizing device as described in claim 1, a needle valve controlling the fuel spray, and means controlling the needle valve comprising a foot throttle acting through lever to open said needle valve, and a spring for closing the needle valve when the valve is released by the foot throttle.

8. In combination with a fuel atomizing device as described in claim 1, a needle valve controlling the fuel spray, means controlling the needle valve comprising a foot throttle acting through levers to open said needle valve, a spring for closing the needle valve when the valve is released by the foot throttle, and means continuing the opening of the needle valve beyond the movement of the foot throttle operated by vacuum of an air passage to which the device may be connected.

9. A fuel atomizing device as described in claim 1, characterized by an air inlet opening for starting, and a closure for said opening adapted to close the opening when the device reaches a predetermined temperature.

10. A fuel atomizing device as described in claim 1, characterized by an air inlet opening for starting, and a closure for said opening adapted to close the opening when the device reaches a predetermined temperature, said closing means comprising a bimetal element.

11. A fuel atomizing and vaporizing device comprising a source of fuel under a pressure greater than atmosphere, a vaporizing chamber, a needle valve connecting the fuel source to the vaporizing chamber to control the fuel, an air inlet for starting only, means closing the air inlet when a predetermined temperature is reached, a mixing chamber having an air inlet, the vaporizing chamber discharging into said mixing chamber through an opening substantially equal to the internal area, in cross section, of the vaporizing chamber, and a throttle to control the said needle valve and also the resulting mixture in the mixing chamber.

GUY TOMSIC.